3,222,203
N-ACYL DERIVATIVES OF CYCLIC IMINES
Evald L. Skau, Robert R. Mod, and Frank C. Magne, New
 Orleans, La., assignors to the United States of America
 as represented by the Secretary of Agriculture
No Drawing. Original application Nov. 8, 1963, Ser. No.
 322,542. Divided and this application Feb. 5, 1964,
 Ser. No. 354,190
16 Claims. (Cl. 106—316)
(Granted under Title 35, U.S. Code (1952), sec. 266)

This application is a division of Serial No. 322,542, filed November 8, 1963, which, in turn, is a continuation-in-part of Serial No. 260,923, filed February 25, 1963.

A non-exclusive, irrevocable, royalty-free license in the invention herein described, throughout the world for all purposes of the United States Government, with the power to grant sublicenses for such purposes, is hereby granted to the Government of the United States of America.

This invention relates to certain compounds which are N-acyl derivatives of cyclic imines, to some unique mixtures of N-acyl derivatives of cyclic imines, and to plastic compositions, the plasticizer component of which is at least one of the compounds or one of the unique mixtures that are the subject of this invention. More particularly, this invention relates to N,N-disubstituted long chain aliphatic amides the acyl component of which is a normal, branched or substituted alkenoic or alkanoic acyl containing from 8 to 22 carbon atoms, the amide nitrogen in all cases being a member of a heterocyclic ring or in the case of a fused ring system one of the heterocyclic rings, all of the other ring members being carbon or nitrogen atoms.

This invention, in addition, relates to certain other new amide plasticizers wherein the acyl component is derived from dibasic alkanoic acids; epoxidized alkanoic, alkenoic, or alkandioic acids; dimer acids; cycloalkanoic, cycloalkenoic, cycloalkandioic, or cycloalkendioic acids which acids contain from 10–18 carbon atoms and in which acids the unsaturation if present may be in the cyclic group, the side chain, or both, such as the naphthenic, terpene-derived, cyclized linoleic acids and their epoxy derivatives.

This invention also relates to certain mixtures of the above-mentioned amides which individually or in combination with other mixtures of amides are compatible plasticizers for vinyl chloride resins.

We have discovered that the compounds and the mixtures of compounds that are the subject of this invention are good, compatible, solvent-type plasticizers for vinyl chloride resins. Moreover, the compounds and mixtures of compounds that are the subject of this invention are efficient primary solvent-type plasticizers which can be made from low price fatty acids and which exhibit good compatibility with and impart low volatility loss, resistance to microbial action, excellent low temperature properties, and stability to northern light exposure to polymer and copolymer resins of vinyl chloride.

The terms "vinyl type resin" and "vinyl chloride resin" are used throughout the specification and claims to refer to polymers and copolymers of monomers containing vinyl chloride in a predominant proportion by weight. Terms such as "compatible," "good compatibility," and "compatible plasticizer" in reference to the plasticizers which are the subject of this invention are used throughout the specification to refer to plasticizers that show no sign of exudation, migration to the surface, for at least two weeks when the plasticizers are present in the resin in proportions of about 70 parts by weight of plasticizer to 100 parts by weight of resin.

Not only are the compounds that are the subject of this invention useful as plasticizers for vinyl chloride resins, but they are also efficient, compatible softeners for Buna N rubber, imparting low volatility loss and excellent low temperature properties to the plasticized rubber compositions.

If a resin is plasticized with a compound with which it has only limited compatibility, the plasticizer soon exudes or migrates to the surface unless the plasticizer is used either in a limited amount or is used in conjunction with a mutual solvent (a compatible auxiliary plasticizer) to obtain adequate compatibility.

It is known in the art that compounds similar to those which are the subject of this invention exhibit reasonably good compatibility for hydrophilic type resins but in order to obtain adequate flexibility must be employed together with a secondary or an auxiliary plasticizer as see for example United States Patent Number 2,339,056.

It would be expected from the recognized compatibility of compounds related to the type herein described with polyvinyl acetals (hydrophilic type resins), that these compounds would be quite incompatible with polymers of the vinyl chloride type. We have discovered, however, that not only are the particular compounds and compound mixtures herein described compatible as primary plasticizers with vinyl chloride resins but as we note above they are compatible with the hydrophilic type resins as well.

Not only are the particular compounds and mixtures of compounds herein described compatible vinyl type resin plasticizers, but the instant invention is considerably broader in that it also contemplates the use of the compatible (compatible with respect to the particular resin involved) binary, ternary, or multiple component mixtures of N-acyl cyclic imines of mixed saturated, monounsaturated, and polyunsaturated acids such as can be derived from animal, fish, or vegetable fats and oils such as tallows, white greases, menhaden oil, cottonseed oil, soybean oil, rapeseed oil, *Crambe abyssinica* seed oil, jojoba oil, parsley seed oil, *Limnanthes douglasii* seed oil, palm oil, *Vernonia anthelmintica* seed oil, castor oil, foots, or from tall oil acids or rosin acids, and other seed oils.

The N-acyl derivatives of this invention decrease in their degree of compatibility as the alkyl portion of the acyl group (if saturated) increases in chain length beyond 15 carbon atoms and they are incompatible when the chain length is 17 or more carbon atoms. In general, the compatibility of a mixture of N-acyl cyclic imines containing a considerable proportion of these less compatible or incompatible N-acyl cyclic imines can be improved by mixing with a compatible plasticizer or by reducing the proportion of the incompatible saturated constituent by such procedures as fractional distillation or fractional crystallization either before or after the amidation step in the preparation of the N-acyl cyclic imine mixture. Similarly, the N-acyl derivatives of this invention decrease in their degree of compatibility as the alkyl portion of the acyl group of the N-acyl derivative (if unsaturated) increases in unsaturation beyond monounsaturation. In general, the compatibility of such a polyunsaturated derivative or of a mixture of N-acyl cyclic imines containing such polyunsaturated acyls can be increased by mixing with a suitable amount of a compatible plasticizer or by decreasing the polyunsaturation of some or all of the polyunsaturated constituents either by physical means, such as fractionation, or by chemical means such as selective hydrogenation, cyanoethylation, halogenation, epoxidation, formylation, maleination, dimerization, cyclization, or the like either before or after the amidation step in the preparation of the N-acyl imine or N-(mixed acyl) cyclic imine. The specific component ratio of compatible compositions can be established according to the scheme set forth in our copending application Serial No. 166,742 filed January 15, 1962. For example, all mixtures of the piperidide of linoleic acid (PL), i.e., N-linoleoylpiperidine, the piperidide of oleic acid (PO), and the piperidide of palmitic acid (PP), in which the weight fraction of PL is less than 35% are compatible plasticizers, the more important plasticizing characteristics of which can be predicted approximately from those of the individual piperidides and their weight proportions in the given mixture.

Also included among the operable N-acyl cyclic imines are those whose acyls are acyls such as the acyls of the following types of acids: monobasic and dibasic normal or branched chain alkanoic acids with substituents in the chain such as dichlorostearic acid; mono- or dihydroxystearic acids; acyloxyacids such as 12-acetoxyoleic, 12-acetoxystearic, 9,10-diacetoxystearic, and acylated ricinoleic acids and the like; 12-beta-cyanoethoxyoleic and 12-cyanoethoxystearic acids and the like; ricinoleic acid; phenylstearic acid; phenoxystearic acid; mono-, di-, or triepoxy stearic acids; mono- or diepoxy oleic acid; epoxydocosanoic acid; dimerized or trimerized linolenic, linoleic, or oleic acid, etc.; cyclic acids such as cyclized linoleic and/or linolenic acids; Diels-Alder adducts of such polyenoic acids as tung oil acids or soybean acids; the Diels-Alder adducts of tung oil acids with di-alkyl maleates, alkyl acrylates, acrylonitrile, fumaronitrile and the like; tall oil acids; rosin-derived or terpene-derived acids such as abietic, l-pimaric, pinonic and the gamma-lactone of beta-hydroxyisopropyl pimelic acid; as well as the monoalkyl esters of dibasic acids such as the monobutyl esters of pinic, adipic, sebacic, azelaic, brassylic, carboxystearic, phthalic, and terephthalic acids, or of phosphonated fatty acids such as dialkyl phosphonostearic acid, and the like.

Also included among the operable N-acyl cyclic imines are the di-imides of dibasic acids, such as N,N'-sebacoyl-dipiperidine, in which the dibasic acid moiety may be that of pinic, adipic, sebacic, azelaic, brassylic, carboxystearic, phthalic and terephthalic acids, or the like.

Also included are the N,N'-diacyl cyclic di-imines wherein the acylating groups are the acyl groups of the forementioned acids and wherein the acylating groups may be the same or different acyls; such as N,N'-didecanoylpiperazine, N-oleoyl-N'-acetylpiperazine or N-epoxyerucoyl-N'-butanoylpiperazine.

Also included are the N-acyl-N'-alkyl cyclic di-imines wherein the acyl groups are the acyl groups of the forementioned acids and wherein the alkyl group contains from 1–10 carbon atoms; such as N-lauroyl-N'-methylpiperazine or N-epoxystearoyl-N'-methylpiperazine. These are particularly effective as anti-microbial or anti-fungal agents.

Terms such as "dimer acid," or "dimerized acids" are used indiscriminately to refer to acids or mixtures of acids consisting essentially of dibasic acids containing from 32 to 44 carbon atoms resulting from the polymerization or dimerization of long chain $C_{16}$ to $C_{22}$ unsaturated fatty acids. Terms such as "trimer acid," or "trimerized acids" are used indiscriminately to refer to acids or mixtures of acids consisting essentially of tribasic acids containing from 48 to 66 carbon atoms resulting from the polymerization or trimerization of long chain $C_{16}$ to $C_{22}$ unsaturated fatty acids.

Also included in this invention are the corresponding N-acyl derivatives of the alkanol and polyalkanol cyclic imines wherein the alkanol group or alkanol groups are acylated by the same acyl group as, or by a different acyl group from, that acylating the imino nitrogen or wherein the alkanol group or alkanol groups are acylated by acyls containing from 2 to 6 carbon atoms; or wherein the alkanol group or alkanol groups are etherified with an alkyl group containing from 1 to 8 carbon atoms; exemplified by such compounds as N-oleoyl-4-(2-oleoyloxyethyl)piperidine, N-decanoyl-4-(omega decanoyloxyalkyl)piperidine, N-oleoyl-4-(3-butanoyloxypropyl)piperidine, N-butanoyl-4-(3-oleoyloxypropyl)piperidine, N-oleoyl-4-(2-ethoxyethyl)piperidine, and N-epoxystearoyl-4-(2-butoxyethyl)piperidine and the like.

Also included among the operable N-acyl derivatives of this invention are the acyl derivatives of 3- to 7-membered substituted cyclic imines in which the substituents may include alkyl, aralkyl, aryl, hydroxy, acyloxy, alkoxyalkyl, cyano, cyanoalkyl, alkoxy, ester, or carbalkoxy groups or the like.

The compounds of the instant invention were tested for vinyl chloride-vinyl acetate (95–5) copolymer resin Vinylite (VYDR) and in polyvinylchloride (Geon 101) in a standard formulation comprising: 63.5% of Vinylite VYDR or Geon 101, 35% plasticizer, 0.5% stearic acid, and 1.0% basic lead carbonate. This formulation for each sample was milled, molded, and tested. In all examples, the sample was rated as incompatible if the molded stock showed any evidence of exudation or migration to the surface during a shelf storage of two weeks.

The compounds that are the subject of this invention are conveniently prepared by reacting the appropriate imine, which in every case is a cyclic imine wherein the nitrogen atom is a member of either the ring or a member of one of the rings if a fused ring compound is involved, with the appropriate acid, acid chloride, or ester. In any event, methods for preparing compounds such as those herein described are well known to those skilled in the art of fatty acid chemistry. The details of individual preparations are listed in the operating examples which follows:

EXAMPLE 1

*N-oleoylpiperidine.*—Twenty-two and four tenths grams (0.26 mole) of piperidine were dissolved in 60 milliliters of benzene and 39.7 grams (0.13 mole) of oleoyl chloride were added dropwise with stirring. After stirring for an additional hour, the reaction mixture was filtered, washed successively with dilute hydrochloric acid and water, and dried over anhydrous sodium sulfate. Free acid was removed by percolating the benzene solution through a column of activated alumina and eluting the amide with a 1:1 ethanol-benzene mixture. The solvent was then removed by stripping under reduced pressure. Analysis of the product, N-oleoylpiperidine: Percent C, 78.15 (theory 78.95); percent H, 12.07 (theory 12.40); percent N, 4.04 (theory 4.04).

EXAMPLE 2

*N - oleoylhexamethylenimine.*—N - oleoylhexamethylenimine was prepared by the procedure of Example 1 from 9.9 grams (0.10 mole) of hexametyhlenimine, 30.0 grams (0.10 mole) of oleoyl chloride, and 8 grams (0.10 mole) of pyridine. Analysis of the product, N-oleoylhexamethylenimine: Percent C, 78.83 (theory 79.21); percent H, 2.11 (theory 12.46); percent N, 3.79 (theory 3.85).

EXAMPLE 3

*N-oleoyl-2-methylpiperidine.*—A mixture of 31.6 grams (0.32 mole) of 2-methylpiperidine, 60 grams (0.21 mole) of oleic acid, and 20 milliliters of benzene was refluxed in an apparatus equipped with a Dean-Stark trap until the evolution of water ceased. The reaction mixture was diluted with 150 milliliters of commercial hexane, washed successively with dilute hydrochloric acid and water, and dried over anhydrous sodium sulfate. Free acid was removed by percolating the hexane solution through a column of activated alumina, and eluting the amide with a 1:1 hexane-ethanol mixture. The solvent was removed by stripping under reduced pressure. Analysis of the product, N-oleoyl-2-methylpiperidine: Percent C, 78.87 (theory 79.20); percent H, 12.13 (theory 12.47); percent N, 3.86 (theory 3.85).

EXAMPLE 4

*N - oleoyl - 3 - methylpiperidine.*—N - oleoyl - 3 - methylpiperidine was prepared by the procedure of Example 3 from 31.6 grams (0.32 mole) of 3-methylpiperidine, and 60 grams (0.21 mole) of oleic acid. Analysis of the product, N-oleoyl-3-methylpiperidine: Percent C, 79.03 (theory 79.20); percent H, 12.30 (theory 12.47); percent N, 3.89 (theory 3.85).

EXAMPLE 5

*N - oleoyl - 4 - methylpiperidine.*—N - oleoyl - 4 - methylpiperidine was prepared by the procedure of Example 3 from 31.6 grams (0.32 mole) of 4-methylpiperidine and 60 grams (0.21 mole) of oleic acid. Analysis of the product, N-oleoyl-4-methylpiperidine: Percent C, 78.80 (theory 79.20); percent H, 12.08 (theory 12.47); percent N, 3.86 (theory 3.85).

EXAMPLE 6

*N - oleoyl - 4 - ethylpiperidine.*—N - oleolyl - 4 - ethylpiperidine was prepared by the procedure of Example 3 from 14.4 grams (0.13 mole) of 4-ethylpiperidine and 30 grams (0.11 mole) of oleic acid. Analysis of the product, N-oleoyl-4-ethylpiperidine: Percent C, 79.17 (theory 79.45); percent H, 12.62 (theory 12.45); percent N, 3.75 (theory 3.71).

EXAMPLE 7

*N - oleoyl - 4 - nonylpiperidine.*—N - oleoyl - 4 - nonylpiperidine was prepared by the procedure of Example 3 from 27 grams (0.13 mole) of 4-nonylpiperidine and 30 grams (0.11 mole) of oleic acid. Analysis of the product, N-oleoyl-4-nonylpiperidine: Percent C, 80.21 (theory 80.70); percent H, 12.67 (theory 12.80); percent N, 2.95 (theory 2.90).

EXAMPLE 8

*N - oleoyl - 2 - methyl - 5 - ethylpiperidine.*—N - oleoyl-2-methyl-5-ethylpiperidine was prepared from 27 grams (0.21 mole) of 2-methyl-5-ethylpiperidine and 40 grams (0.14 mole) of oleic acid by Example 3, except that toluene was used as the entraining solvent. Analysis of the product, N-oleoyl-2-methyl-5-ethylpiperidine: Percent C, 79.51 (theory 79.66); percent H, 12.40 (theory 12.51); percent N, 3.79 (theory 3.85).

EXAMPLE 9

*Piperidide of selectively hydrogenated cottonseed oil fatty acids.*—The piperidide of selectively hydrogenated cottonseed oil fatty acids were prepared by the procedure of Example 3 from 18.6 grams (0.22 mole) of piperidine and 40 grams (0.14 mole) of selectively hydrogenated cottonseed oil fatty acids. (The selectively hydrogenated cottonseed oil fatty acids had an iodine value of 73.2, a thiocyanogen value of 68.0, and a neutralization equivalent of 274.) The product, the piperidides of selectively hydrogenated cottonseed oil fatty acids, had a nitrogen content of 4.08%.

EXAMPLE 10

*Piperidide of animal acids.*—The piperidide of "animal acids" (Neofat No. 65) was prepared by the procedure of Example 3 from 18.6 grams (0.22 mole) of piperidine and 40 grams (0.15 mole) of Neofat 65. (The "animal acids" consisted of a mixture of fatty acids having the following composition: 2% myristic, 26% palmitic, 16% stearic, 48% oleic, and 8% linoleic acids.) The product, the piperidide of animal acids, had a nitrogen content of 3.95%.

EXAMPLE 11

*N-oleoylpyrrolidine.*—N-oleoylpyrrolidine was prepared by the procedure of Example 3 from 15.1 grams (0.21 mole) of pyrrolidine and 40 grams (0.14 mole) of oleic acid. Analysis of the product, N-oleoylpyrrolidine: percent C, 77.81 (theory 78.67); percent H, 12.11 (theory 12.32); percent N, 4.30 (theory 4.17).

EXAMPLE 12

*N-oleoyl - 1,2,3,4 - tetrahydroquinoline.*—N-oleoyl-1,2,3,4-tetrahydroquinoline was prepared from 15 grams (0.11 mole) of 1,2,3,4-tetrahydroquinoline, 35 grams (0.11 mole) of oleoyl chloride, and 9.2 grams (0.11 mole) of pyridine by the procedure of Example 1, except that the free unreacted acid was removed by washing with 4% alcoholic KOH followed by water washings. Analysis of the product N-oleoyl-1,2,3,4-tetrahydroquinoline: percent C, 80.89 (theory 81.48); percent H, 10.91 (theory 10.81); percent N, 3.31 (theory 3.52).

EXAMPLE 13

*N-oleoyl-2,6-dimethylpiperidine.*—N-oleoyl-2,6-dimethylpiperidine was prepared by the procedure of Example 1 from 30.1 grams (0.27 mole) of 2,6-dimethylpiperidine, and 40 grams (0.13 mole) of oleoyl chloride. Analysis of the product, N-oleoyl-2,6-dimethylpiperidine: percent C, 79.19 (theory 79.12); percent H, 12.43 (theory 12.30); percent N, 3.74 (theory 3.72).

EXAMPLE 14

*N-oleoylcarbazole.*—A mixture of 16.7 grams (0.10 mole) of carbazole, 30 grams (0.10 mole) of oleoyl chloride and 60 milliliters of xylene was refluxed for 4 hours. The reaction mixture was washed successively with dilute hydrochloric acid and water and dried over anhydrous sodium sulfate. Free acid was removed by percolating the xylene solution through a column of activated alumina and eluting the amide with a 1:1 ethanol-xylene mixture. The solvent was then removed by stripping under reduced pressure. Analysis of the product, N-oleoylcarbazole: percent C, 82.98 (theory 83.40); percent H, 9.50 (theory 9.50); percent N, 3.24 (theory 3.25).

EXAMPLE 15

N-oleoyl-3-azobicyclo[3,2,2]nonane was prepared by the procedure of Example 12 from 12.5 grams (0.10 mole) of 3-azabicyclol[3,2,2]nonane, 30 grams (0.10 mole) of oleoyl chloride, and 8 grams (0.10 mole) of pyridine. Analysis of the product, N-oleoyl-3-azabicyclo [3,2,2]nonane: percent C, 79.20 (theory 80.09); percent H, 11.95 (theory 12.06); percent N, 3.40 (theory 3.60).

EXAMPLE 16

*N-palmitoylpiperidine.*—N-palmitoylpiperidine was prepared by the procedure of Example 3 from 19 grams (0.22 mole) of piperidine and 40 grams (0.15 mole) of palmitic acid. Analysis of the product, N-palmitoylpiperidine: percent C, 78.02 (theory 77.88); percent H, 12.70 (theory 12.77); percent N, 3.89 (theory 4.33).

EXAMPLE 17

*N,N'-sebacoyldipiperidine.*—N,N'-sebacoyldipiperidine was prepared by the procedure of Example 3 from 78 grams (0.92 mole) of piperidine and 40 grams (0.20 mole) of sebacic acid, except that the free unreacted acid was removed by dissolving the reaction product in carbon tetrachloride, treating with a slight excess of 4% alcoholic KOH, and washing with water. Analysis of the product, N,N'-sebacoyldipiperidine: percent C, 71.35 (theory 71.31); percent H, 10.63 (theory 10.70); percent N, 8.18 (theory 8.32).

EXAMPLE 18

*N-stearoylpiperidine.*—N-stearoylpiperidine was prepared by the procedure of Example 3 from 27 grams (0.32 mole) of piperidine and 45 grams (0.16 mole) of stearic acid. Analysis of the product, N-stearoylpiperidine: percent C, 78.50 (theory 78.49); percent H, 12.75 (theory 12.90); percent N, 3.96 (theory 3.98).

EXAMPLE 19

*Piperidide of dimer acid (Empol 1014).*—The piperidide of dimer acid was prepared by the procedure of Example 3 from 18.3 grams (0.22 mole) of piperidine and 40 grams (0.07 mole) of dimer acid (Empol 1014). The product, the piperidide of dimer acid, had a nitrogen content of 3.98%.

EXAMPLE 20

*Mixed piperidides of oleic acid.*—This was a physical mixture consisting of 3.6% by weight of the sample of Example 3, 46.4% by weight of the sample of Example 4, 35.7% by weight of the sample of Example 5, and 14.3% of the sample of Example 13.

EXAMPLE 21

*N - erucoylpiperidine.*—N - erucoylpiperidine was prepared by the procedure of Example 3 from 11.1 grams (0.13 mole) of piperidine and 40 grams (0.12 mole) of erucic acid. Analysis of the product, N-erucoylpiperidine: percent C, 79.84 (theory 79.86); percent H, 12.61 (theory 12.67); percent N, 3.48 (theory 3.41).

EXAMPLE 22

*N-decanoyl - 4 - nonylpiperidine.*—N-decanoyl-4-nonylpiperidine was prepared by the procedure of Example 3 from 53 grams (0.25 mole) of 4-nonylpiperidine and 40 grams (0.23 mole) of decanoic acid. Analysis of the product, N-decanoyl-4-nonylpiperidine: percent C, 78.69 (theory 78.78); percent H, 12.90 (theory 12.96); percent N, 3.76 (theory 3.83).

EXAMPLE 23

*N-epoxystearoylpiperidine.*—N-epoxystearoylpiperidine was prepared by epoxidation of N-oleoylpiperidine using perbenzoic acid. The product, N-epoxystearoylpiperidine, had an oxirane oxygen content of 4.49%.

EXAMPLE 24

*Piperidide of rapeseed oil fatty acids.*—The piperidide of rapeseed oil fatty acids was prepared by the procedure of Example 3 from 18.5 grams (0.22 mole) of piperidine and 60 grams (0.20 mole) of rapeseed oil fatty acids. The product, the piperidide of rapeseed oil fatty acids, had a nitrogen content of 3.56%.

EXAMPLE 25

*N,N' - dioleoyl - dipiperidinomethane.*—N,N'-dioleoyl-dipiperidinomethane was prepared by the procedure of Example 3 from 18.1 grams (0.10 mole) of dipiperidinomethane and 50 grams (0.18 mole) of oleic acid. Analysis of the product, N,N'-dioleoyl-dipiperidinomethane: Percent C, 78.52 (theory 79.30); percent H, 12.14 (theory 12.19); percent N, 3.94 (theory 3.94).

EXAMPLE 26

*N - oleoyl - 4(5 - nonyl)piperidine.*—N - oleoyl - 4(5-nonyl)piperidine was prepared by the procedure of Example 3 from 41.1 grams (0.19 mole) of 4-(5-nonyl) piperidine and 50 grams (0.18 mole) of oleic acid. Analysis of the product, N-oleoyl-4(5-nonyl)piperidine: Percent C, 80.62 (theory 80.70); percent H, 12.80 (theory 12.80); percent N, 2.99 (theory 2.90).

EXAMPLE 27

*Mixed piperidides of oleic acid.*—Mixed piperidides of oleic acid was prepared by the procedure of Example 3 from 55 grams (0.42 mole) of mixed piperidines (commercial by-product mixture of alkyl piperidines) and 100 grams (0.35 mole) of oleic acid. The product, the mixed piperidides of oleic acid, had a nitrogen content of 3.63%.

EXAMPLE 28

*N,N'-dioleoylpiperazine.*—N,N'-dioleoylpiperazine was prepared by the procedure of Example 3 from 9.2 grams (0.11 mole) if piperazine and 60 grams (0.21 mole) of oleic acid. Analysis of the product, N,N'-dioleoylpiperazine: Percent C, 77.77 (theory 78.04); percent H, 12.12 (theory 12.13); percent N, 4.64 (theory 4.55).

EXAMPLE 29

*N - oleoyl - N' - methylpiperazine.*—N - oleoyl - N'-methylpiperazine was prepared by the procedure of Example 1 from 23.3 grams (0.23 mole) of N-methylpiperazine and 35.0 grams (0.12 mole) of oleoyl chloride. Analysis of the product, N-oleoyl-N'-methylpiperazine: Percent C, 74.46 (theory 75.70); percent H, 11.63 (theory 12.07); percent N, 7.43 (theory 7.68).

EXAMPLE 30

*N,N' - didecanoylpiperazine.*—N,N' - didecanoylpiperazine was prepared by the procedure of Example 17 from 13.8 grams (0.16 mole) of piperazine and 60.2 grams (0.35 mole) of decanoic acid. Analysis of the product, N,N'-didecanoylpiperazine: Percent C, 73.15 (theory 73.09); percent H, 11.68 (theory 11.75); percent N, 7.07 (theory 7.09).

EXAMPLE 31

*Piperidide of cottonseed oil fatty acids.*—The piperidine of cottonseed oil fatty acids was prepared by the procedure of Example 3 from 18.6 grams (0.22 mole) of piperidine and 40 grams (0.14 mole) of cottonseed oil fatty acids. The product, the piperidide of cottonseed oil fatty acids, had a nitrogen content of 3.94%.

EXAMPLE 32

*N-linoleoylpiperidine.*—N-linoleoylpiperidine was prepared by the procedure of Example 3 from 20 grams (0.23 mole) of piperidine and 60 grams (0.21 mole) of linoleic acid. Analysis of the product, N-linoleoylpiperidine: Percent C, 79.00 (theory 79.40); percent H, 11.77 (theory 11.89); percent N, 3.92 (theory 4.03).

The samples of Examples 1 to 36, inclusive, were evaluated as plasticizers for Vinylite VYDR resin and the samples of Examples 1 and 16 were evaluated as plasticizers for Geon 101 using the afore-described formulations. The results are reported in Table I which includes the results for di-2-ethylhexylphthalate (DOP) as control.

The samples of Examples 1, 9, and 27 were evaluated as nitrile rubber (Hycar 1042–33% acrylonitrile) softeners. The formulation employed was as follows:

|  | Percent | Parts/100 parts of rubber |
|---|---|---|
| Nitrile rubber (33% acrylonitrile) | 52.8 |  |
| SRF black | 31.7 | 60.0 |
| Zinc oxide | 2.6 | 5.0 |
| Stearic acid | 0.79 | 1.5 |
| Sulfur | 0.79 | 1.5 |
| Accelerator | 0.79 | 1.5 |
| Softener | 10.6 | 20.0 |

These compositions were cured for 30 minutes at 310° F. None showed any signs of exudation in 15 days. The evaluation results are given in Table II which also includes the results for the control, dibutylsebacate (DBS).

Table I

| Example No. | Plasticizer | Tensile strength, p.s.i. | 100% modulus, p.s.i. | Elongation, percent | Brittle point, °C. | Volatility loss, percent | Compatibility [a] |
|---|---|---|---|---|---|---|---|
| 1 | N-oleoylpiperidine | 2,670 | 1,170 | 390 | −47 | 1.18 | C |
| 1 | N-oleoylpiperidine [b] | 2,990 | 1,400 | 330 | −41 | | C |
| 2 | N-oleoylhexamethylenimine | 2,650 | 1,300 | 350 | −49 | | C |
| 3 | N-oleoyl-2-methylpiperidine | 2,470 | 1,240 | 310 | −39 | 0.83 | C |
| 4 | N-oleoyl-3-methylpiperidine | 2,500 | 1,170 | 330 | −43 | 0.79 | C |
| 5 | N-oleoyl-4-methylpiperidine | 2,520 | 1,240 | 310 | −43 | 0.65 | C |
| 6 | N-oleoyl-4-ethylpiperidine | 2,760 | 1,280 | 390 | −45 | 0.47 | C |
| 7 | N-oleoyl-4-nonylpiperidine | 2,780 | 1,700 | 330 | −51 | 0.27 | C |
| 8 | N-oleoyl-2-methyl-5-ethylpiperidine | 2,870 | 1,340 | 380 | −37 | 0.40 | C |
| 9 | Piperidide of hydrogenated cottonseed oil fatty acids. | 2,660 | 1,220 | 370 | −45 | 0.38 | C |
| 10 | Piperidide of animal acids [c] | 2,710 | 1,180 | 370 | −39 | 0.88 | C |
| 11 | N-oleoylpyrrolidine | 2,400 | 990 | 370 | −47 | | C |
| 12 | N-oleoyl-1,2,3,4-tetrahydroquinoline | 2,990 | 1,470 | 350 | −39 | | C |
| 13 | N-oleoyl-2,6-dimethylpiperidine | 2,990 | 1,430 | 360 | −37 | | C |
| 14 | N-oleoylcarbazole | 3,500 | 2,500 | 300 | −23 | | I |
| 15 | N-oleoyl-3-azabicyclo[3,2,2]nonane | 3,000 | 1,580 | 310 | −35 | | C |
| 16 | N-palmitoylpiperidine | 2,680 | 1,160 | 350 | −35 | | C |
| 16 | N-palmitoylpiperidine [b] | 2,840 | 1,300 | 350 | −37 | | C |
| 17 | N,N′-sebacoyldipiperidine | 3,040 | 1,650 | 330 | +7 | | C |
| 18 | N-stearoylpiperidine | 2,770 | 1,290 | 360 | −29 | | I |
| 19 | Piperidide of dimer acid (Empol 1014) | 3,190 | 2,630 | 180 | −3 | | C |
| 20 | Mixed piperidides of oleic acid [d] | 2,730 | 1,290 | 350 | −43 | | C |
| 21 | N-erucoylpiperidine | 2,890 | 1,380 | 400 | −49 | | C |
| 22 | N-decanoyl-4-nonylpiperidine | 2,880 | 1,350 | 390 | −39 | | C |
| 23 | N-epoxystearoylpiperidine | 2,810 | 1,180 | 340 | −21 | | C |
| 24 | Piperidide of rapeseed oil fatty acids | 2,750 | 1,300 | 340 | −53 | | C |
| 25 | N,N′-dioleoyl-dipiperidinomethane | 2,840 | 1,190 | 390 | −49 | | C |
| 26 | N-oleoyl-4(5-nonyl)piperidine | 2,990 | 1,750 | 340 | −39 | | C |
| 27 | Mixed piperidides of oleic acid [e] | 2,910 | 1,380 | 370 | −43 | | C |
| 28 | N,N-dioleoylpiperazine | 2,880 | 1,330 | 380 | −37 | | I |
| 29 | N-oleoyl-N′-methylpiperazine | 2,510 | 1,810 | 280 | −43 | | I |
| 30 | N,N′-didecanoylpiperazine | 2,830 | 1,770 | 250 | −23 | | I |
| 31 | Piperidide of cottonseed oil fatty acids | 2,560 | 1,200 | 330 | −45 | | C |
| 32 | N-linoleoylpiperidine | | | | | | I |
| 33 | Piperidide of mixed acids [f] | | | | | | C |
| 34 | Piperidide of mixed acids [g] | | | | | | C |
| 35 | Piperidide of mixed acids [h] | | | | | | C |
| 36 | Piperidide of mixed acids [i] | | | | | | C |
| | Di-2-ethylhexylphthalate (control) | 3,050 | 1,690 | 330 | −33 | 1.99 | C |

[a] C=Compatible, I=Incompatible.
[b] Using poly(vinyl chloride) homopolymer instead of Vinylite VYDR resin.
[c] 2% myristic acid, 26% palmitic acid, 16% stearic acid, 48% oleic acid, and 8% linoleic acid.
[d] Mixture of 3.6%, 46.4%, 35.7%, and 14.3% by weight of samples of Examples 3, 4, 5, and 13, respectively.
[e] Made from a commercial by-product mixture of alkyl piperidines.
[f] Mixture of 60% and 40% by weight of the samples of Examples 16 and 32, respectively.
[g] Mixture of 32.5%, 32.5%, and 35.0% by weight of the samples of Examples 1, 16, and 32, respectively.
[h] Mixture of 30%, 30%, and 40% by weight of the samples of Examples 1, 16, and 32, respectively.
[i] Mixture of 27.5%, 27.5%, and 45% by weight of the samples of Examples 1, 16, and 32, respectively.

Table II

| Example No. | 300% modulus, p.s.i. | | Tensile strength, p.s.i. | | Ultimate elongation, percent | | Hardness, Shore A | Brittle point, °C. | Volatility, percent | Swelling, percent |
|---|---|---|---|---|---|---|---|---|---|---|
| | Unaged | Aged | Unaged | Aged | Unaged | Aged | | | | |
| 1 | 600 | 990 | 1,940 | 2,140 | 710 | 510 | 50 | −48 | 0.52 | 22.2 |
| 9 | 560 | 1,000 | 1,850 | 1,950 | 700 | 510 | 52 | −48 | 0.96 | 22.5 |
| 27 | 590 | 1,050 | 1,910 | 1,930 | 680 | 500 | 53 | −48 | 0.94 | 22.9 |
| DBS (control) | 960 | 1,920 | 2,170 | 2,350 | 580 | 370 | 55 | −55 | 5.52 | 20.9 |

Samples of Vinylite VYDR resin plasticized with the N-oleoylpiperidine of Example 1, the N-oleoyl-2-methylpiperidine of Example 3, the mixed piperidides of oleic acid of Example 20, and the N-oleoyl-2,6-dimethylpiperidine of Example 13, respectively, were subjected to standard soil-burial tests using similar samples of VYDR resin plasticized with N-oleoylmorpholine as controls. After 29 days localized areas of discoloration indicating microbial attack appeared in the control. None of the other specimens showed any signs of discoloration after 56 days. After 85 days the samples plasticized with N-oleoylpiperidine, and N-oleoyl-2-methylpiperidine were completely discolored, the sample plasticized with the mixed piperidides of oleic acid showed only localized discoloration, and the sample plasticized with N-oleoyl-2,6-dimethylpiperidine showed no signs of discoloration.

Improved light stability and thermal stability can be attained by inclusion of suitable stabilizers and/or antioxidants in the resin-plasticizer formulation.

The soapy water extractability can be reduced by the use of additives such as hydrocarbon extenders.

EXAMPLE 37

*N - 2 - ethylhexanoylpiperidine.*—N - 2 - ethylhexanoylpiperidine was prepared by the procedure of Example 1 from 26.2 grams (0.31 mole) of piperidine, 50 grams (0.31 mole) of 2-ethylhexanoyl chloride, and 24.3 grams (0.31 mole) of pyridine. Analysis of the product, N-2-ethylhexanoylpiperidine. Percent C, 72.43 (theory 73.81); percent H, 11.82 (theory 11.83); percent N, 6.52 (theory 6.63).

EXAMPLE 38

*N - naphthenoylpiperidine.*—N - naphthenoylpiperidine was prepared by the procedure of Example 3 from 21.6 grams (0.25 mole) of piperidine, and 50 grams (0.23 mole) of naphthenic acid. The product, N-naphthenoylpiperidine, had a nitrogen content of 5.02%.

EXAMPLE 39

*N-ricinoleoylpiperidine.*—A mixture of 24.5 grams (0.58 mole) of piperidine, 90 grams (0.29 mole) of methyl ricinoleate was refluxed for a 36 hour period, at a temperature just sufficient to distill the methanol evolved from the reaction mixture but not enough to distill off the piperidine. The reaction mixture was diluted with 100 ml. of commercial hexane, washed successively with dilute HCl and water and dried over anhydrous sodium sulfate. The solvent was removed by stripping under reduced pressure. The product was isolated by rapid, vacuum distillation. Analysis of the product, N-ricinoleoylpiperidine: percent C, 75.59 (theory 75.49); percent H, 11.82 (theory 11.76); percent N, 3.69 (theory 3.83).

EXAMPLE 40

*N-oleoyl-2-ethylpiperidine.*—N-oleoyl-2-ethylpiperidine was prepared by the procedure of Example 3 from 17.6 grams (0.16 mole) of 2-ethylpiperidine and 40 grams (0.14 mole) of oleic acid. Analysis of the product, N-oleoyl-2-ethylpiperidine: percent C, 79.21 (theory 79.44); percent H, 12.55 (theory 12.51); percent N, 3.64 (theory 3.71).

EXAMPLE 41

*N - oleoyl - 2 - propylpiperidine.*—N - oleoyl - 2 - propylpiperidine was prepared by the procedure of Example 1 from 11 grams (0.09 mole) of 2-propylpiperidine, 26 grams (0.09 mole) of oleoyl chloride, and 6.8 grams (0.09 mole) of pyridine. Analysis of the product, N-oleoyl-2-propylpiperidine: percent C, 79.30 (theory 79.65); percent H, 12.45 (theory 12.61); percent N, 3.50 (theory 3.57).

EXAMPLE 42

*N - oleoyl - 4 - propylpiperidine.*—N - oleoyl - 4 - propylpiperidine was prepared by the procedure of Example 3 from 19.8 grams (0.16 mole) of 4-propylpiperidine, and 40 grams (0.14 mole) of oleic acid. Analysis of the product, N-oleoyl-4-propylpiperidine: percent C, 79.66 (theory 79.65); percent H, 12.61 (theory 12.61); percent N, 3.72 (theory 3.57).

EXAMPLE 43

*N - oleoyl - 2 - benzylpiperidine.*—N - oleoyl - 2 - benzylpiperidine was prepared by the procedure of Example 1 from 17.5 grams (0.10 mole) of 2-benzylpiperidine, 30 grams (0.10 mole) of oleoyl chloride, and 7.9 grams (0.10 mole) pyridine. Analysis of the product: percent C, 81.73 (theory 81.74); percent H, 11.17 (theory 11.44); percent N, 3.12 (theory 3.18).

EXAMPLE 44

*N - oleoyl - 4 - benzylpiperidine.*—N - oleoyl - 4 - benzylpiperidine was prepared by the procedure of Example 3 from 27.2 grams (0.16 mole) of 4-benzylpiperidine and 40 grams (0.14 mole) of oleic acid. Analyiss of the product: percent C, 81.86 (theory 81.74); percent H, 11.16 (theory 11.44); percent N, 3.25 (theory 3.18).

EXAMPLE 45

*Ethyl 2,2 - dimethyl - 3 - (4 - n - nonylpiperidino)-carbonylcyclobutaneacetate.*—Ethyl 2,2-dimethyl-3-(4-n-nonylpiperidino) carbonylcyclobutaneacetate was prepared by the procedure of Example 1 from 27.3 grams (0.13 mole) of 4-n-nonylpiperidine, 30 grams (0.13 mole) of ethyl 2,2-dimethyl-3-chlorocarbonylcyclobutaneacetate, and 10.2 grams (0.13 mole) of pyridine. Analysis of the product: percent C, 72.75 (theory 73.64); percent H, 11.09 (theory 11.13); percent N, 3.41 (theory 3.44).

EXAMPLE 46

*N - oleoyl - 4 - (3 - acetoxypropyl)piperidine.*—Fifty grams (0.17 mole) of methyl oleate was slowly added to a vigorously stirred mixture of 24.2 grams (0.17 mole) of 4-propanolpiperidine and 0.61 gram (0.026 mole) of metallic sodium dissolved in absolute methanol. The reaction was carried out with continued stirring at 65 to 75° C. and at 60 millimeters pressure. The reaction was complete after all the methyl oleate had been added and the evolution of methanol has ceased. The product of this reaction was N-oleoyl-4-(3-oleoyloxypropyl)-piperidine. The desired product, N-oleoyl-4-propanolpiperidine, was obtained by cold saponification of the ester linkage, acidification with hydrochloric acid, solution in hexane, water washing, and drying over anhydrous sodium sulfate. The free acid was removed by percolating the hexane solution through a column of activated alumina and eluting the amide with a 1:1 ethanolbenzene mixture. The solvent was removed by stripping under reduced pressure. Titration with HCl showed the absence of free amine.

26 grams (0.06 mole) of this product, N-oleoyl-4-propanolpiperidine, and 5.1 grams pyridine (0.06 mole) were dissolved in 75 ml. of benzene and 5 grams (0.06 mole) of acetyl chloride were added dropwise with stirring. After stirring for an additional hour, the reaction mixture was filtered, washed successively with dilute hydrochloric acid and water, and dried over anhydrous sodium sulfate. The solvent was then removed by stripping under reduced pressure. Analysis of the product, N-oleoyl-4-(3-acetoxypropyl)piperidine: Percent C., 75.31 (theory 74.39); percent H, 11.92 (theory 11.43); percent N, 3.12 (theory 3.12).

EXAMPLE 47

*N - erucoyl - 4 - n - nonylpiperidine.*—N-erucoyl-4-n-nonylpiperidine was prepared by the procedure of Example 3 from 34.3 grams (0.16 mole) of 4-n-nonylpiperidine and 50 grams (0.15 mole) of erucic acid. Analysis of the product, N-erucoyl-4-n-nonylpiperidine: Percent C., 81.39 (theory 80.70); percent H, 12.91 (theory 12.80); percent N, 2.66 (theory 2.66).

EXAMPLE 48

*Piperidine of* Limnanthes douglasii *seed oil fatty acids.*—The piperidine of Limnanthes douglasii seed oil fatty acids was prepared by the procedure of Eaxmple 3 from 10.6 grams (0.13 mole) of piperidine and 35 grams (0.11 mole) of Limnanthes douglasii seed oil fatty acids. The product, the piperidine of Limnanthes douglasii seed oil fatty acids, had a nitrogen content of 3.63%.

The samples of Examples 37 to 48, inclusive, were evaluated as plasticizers in Vinylite VYDR resin. The results are reported in Table III.

EXAMPLE 49

N-epoxyoleoylpiperidine was an epoxidized sample of the N-linoleoylpiperidine of Example 32, having an oxirane oxygen content of 4.87% and an iodine value of 55.4.

EXAMPLE 50

N-diepoxystearoylpiperidine was an epoxidized sample of the N-linoleoylpiperidine of Example 32, having an oxirane oxygen content of 7.51% and an iodine value of 6.35.

Table III

| Example No. | Plasticizer | Tensile strength, p.s.i. | 100% modulus, p.s.i. | Elongation, percent | Brittle point, °C. | Volatility loss, percent | Compatibility, |
|---|---|---|---|---|---|---|---|
| 37 | N-2-ethylhexanoylpiperidine | 2,110 | 1,040 | 290 | −27 | 1.3 | C |
| 38 | N-naphthenoylpiperidine | 3,110 | 1,690 | 340 | +1 | | C |
| 39 | N-ricinoleoylpiperidine | 3,180 | 1,700 | 380 | −29 | | C |
| 40 | N-oleoyl-2-ethylpiperidine | 2,880 | 1,390 | 360 | −45 | | C |
| 41 | N-oleoyl-2-propylpiperidine | 3,050 | 1,680 | 320 | −33 | | C |
| 42 | N-oleoyl-4-propylpiperidine | 2,950 | 1,410 | 370 | −45 | | C |
| 43 | N-oleoyl-2-benzylpiperidine | 3,260 | 1,740 | 320 | −23 | | C |
| 44 | N-oleoyl-4-benzylpiperidine | 3,160 | 1,730 | 320 | −23 | | C |
| 45 | Ethyl 2,2-dimethyl-3-(4-n-nonylpiperidino) carbonylcyclobutaneacetate. | 3,180 | 1,860 | 320 | −1 | | C |
| 46 | N-oleoyl-4-(3-acetoxypropyl)piperidine. | 2,950 | 1,260 | 380 | −29 | | C |
| 47 | N-erucoyl-4-n-nonylpiperidine | 1,930 | 1,720 | 160 | −27 | | C |
| 48 | Piperidide of *Limnanthes douglasii* Seed oil fatty acids. | 2,770 | 1,360 | 370 | −45 | 1.4 | |
| 49 | N-epoxyoleoylpiperidine | 2,550 | 1,170 | 330 | −23 | | C |
| 50 | N-diepoxystearoylpiperidine | 2,730 | 1,200 | 340 | −11 | | C |
| | Di-2-ethylhexylphthalate (Control) | 3,050 | 1,690 | 330 | −33 | 1.99 | C |

EXAMPLES 51 TO 60

The piperidine mixture used in Examples 51, 52, 53, 54, 55, 56, and 57 for which the compatibility data are given in Table III, were binary compositions prepared by mixing appropriate proportions of the piperidide of the linoleic acid (PL) with either the piperidide of oleic acid (PO) or with the piperidide of palmitic acid (PP). The piperidide mixtures used in Examples 58, 59, and 60 were ternary mixtures prepared by mixing appropriate portions of the piperidides of oleic, palmitic and linoleic acids. The compositions and the results of the compatibility tests for these samples are given in Table IV.

Table IV

| Example No. | PL | PO | PP | Compatibility |
|---|---|---|---|---|
| | Percent | Percent | Percent | |
| 51 | 15 | 85 | 0 | C |
| 52 | 20 | 80 | 0 | C |
| 53 | 30 | 70 | 0 | C |
| 54 | 10 | 0 | 90 | C |
| 55 | 20 | 0 | 80 | C |
| 56 | 30 | 0 | 70 | C |
| 57 | 40 | 0 | 60 | C |
| 58 | 35 | 32.5 | 32.5 | C |
| 59 | 40 | 30 | 30 | C |
| 60 | 45 | 27.5 | 27.5 | C |

We claim:
1. N-2-ethylhexanoylpiperidine.
2. N-naphthenoylpiperidine.
3. N-ricinoleoylpiperidine.
4. N-oleoyl-2-ethylpiperidine.
5. N-oleoyl-2-propylpiperidine.
6. N-oleoyl-4-propylpiperidine.
7. N-oleoyl-2-benzylpiperidine.
8. N-oleoyl-4-benzylpiperidine.
9. N-erucoyl-4-n-nonylpiperidine.
10. Piperidide of *Limnanthes douglasii* seed oil fatty acids.
11. N-epoxyoleoylpiperidine.
12. N-diepoxystearoylpiperidine.
13. The binary mixture of the piperidide of linoleic acid and the piperidide of oleic acid in which binary mixture the weight percent of the piperidide of oleic acid amounts to at least 65 percent.
14. The binary mixture of the piperidide of linoleic acid and the piperidide of palmitic acid in which binary mixture, the weight percent of the piperidide of palmitic acid amounts to at least 65 percent.
15. The ternary mixture of the piperidides of oleic acid, linoleic acid and palmitic acid in which ternary mixture, the weight percent of the piperidide of linoleic acid is not more than about 35 percent.
16. N-epoxystearoylpiperidine.

References Cited by the Examiner
UNITED STATES PATENTS

| 2,166,118 | 7/1939 | Bousquet et al. | 167—33 |
| 2,166,120 | 7/1939 | Bousquet et al. | 167—22 |
| 2,863,845 | 12/1958 | Magne et al. | 260—247.7 |
| 3,079,388 | 2/1963 | Dupuy et al. | 260—247.7 |

FOREIGN PATENTS

| 503,490 | 4/1939 | Great Britain. |
| 503,507 | 4/1939 | Great Britain. |

OTHER REFERENCES

Szeki: "Chemical Abstracts," vol. 31, page 5355[3] (1937).

D'Ianni et al.: "J. Am. Chem. Soc.," vol. 61, pages 1675–81 (1939).

MORRIS LIEBMAN, *Primary Examiner.*

NICHOLAS S. RIZZO, *Examiner.*